US012343766B2

(12) United States Patent
Brewer et al.

(10) Patent No.: US 12,343,766 B2
(45) Date of Patent: Jul. 1, 2025

(54) ROPE CLEANER

(71) Applicant: Brewer Open Range Agricultural Business LLC, Paradise, TX (US)

(72) Inventors: Michael Glen Brewer, Paradise, TX (US); Dustin Whitaker, Childress, TX (US)

( * ) Notice: Subject to any disclaimer, the term of this patent is extended or adjusted under 35 U.S.C. 154(b) by 0 days.

(21) Appl. No.: 18/508,184

(22) Filed: Nov. 13, 2023

(65) Prior Publication Data

US 2024/0246120 A1 Jul. 25, 2024

Related U.S. Application Data

(60) Provisional application No. 63/481,532, filed on Jan. 25, 2023.

(51) Int. Cl.
*B08B 1/20* (2024.01)
*B08B 11/00* (2006.01)

(52) U.S. Cl.
CPC ................ *B08B 1/20* (2024.01); *B08B 11/00* (2013.01)

(58) Field of Classification Search
CPC .. B08B 1/12; B08B 1/20; B08B 11/00; B66B 7/1246
See application file for complete search history.

(56) References Cited

U.S. PATENT DOCUMENTS

| | | | | |
|---|---|---|---|---|
| 1,253,363 A * | 1/1918 | Farr | A47L 13/08 | 15/268 |
| 2,568,247 A * | 9/1951 | Medearis | E21B 33/08 | 15/220.4 |
| 4,375,115 A * | 3/1983 | Zimmerman | A46B 9/02 | 15/210.1 |

* cited by examiner

*Primary Examiner* — Shay Karls
(74) *Attorney, Agent, or Firm* — Shannon Warren

(57) ABSTRACT

A rope cleaning tool for cleaning a rope. The rope cleaning tool comprises one or more wiper disks and a frame assembly. The frame assembly comprises a first shell portion and a second shell portion, and a plurality of fasteners. The plurality of fasteners comprise at least a first fastener, and each comprise a first fastener portion and a second fastener portion. The frame assembly is attached to a portion of the one or more wiper disks using a portion of the plurality of fasteners. Each among the frame assembly comprises an enclosed end and an open end. The one or more wiper disks comprises a receiver slot and a wiping aperture. The receiver slot is aligned with the open end of the frame assembly.

17 Claims, 15 Drawing Sheets

ROPE CLEANER

CROSS-REFERENCE TO RELATED APPLICATIONS

This application claims benefit to U.S. provisional utility patent application No. 63/481,532 filed 2023 Jan. 25.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

No prior art is known to the Applicant.

BRIEF SUMMARY OF THE INVENTION

A rope cleaning tool for cleaning a rope. Said rope cleaning tool comprises one or more wiper disks and a frame assembly. Said frame assembly comprises a first shell portion and a second shell portion, and a plurality of fasteners. Said plurality of fasteners comprise at least a first fastener, and each comprise a first fastener portion and a second fastener portion. Said frame assembly is attached to a portion of said one or more wiper disks using a portion of said plurality of fasteners. Each among said frame assembly comprises an enclosed end and an open end. Said one or more wiper disks comprises a receiver slot and a wiping aperture. Said receiver slot is aligned with said open end of said frame assembly. Said receiver slot and said wiping aperture comprises a cut in said one or more wiper disks allowing an object to pass through said receiver slot and slide into said wiping aperture without disassembling said rope cleaning tool. Said wiping aperture can further comprise a central portion and a plurality of radial slots arranged around said central portion. Said central portion comprises a round shape. Said plurality of radial slots extend outward from said central portion toward said frame assembly. Said plurality of radial slots are configured to allow said one or more wiper disks to be deformed when squeezing said frame assembly with an inward force. Said one or more wiper disks comprises a plurality of bristles comprising portions of said one or more wiper disks between said plurality of radial slots. Each among said plurality of bristles are configured for cleaning objects in said wiping aperture. Said rope cleaning tool comprises an unsqueezed configuration and a squeezed configuration. Said unsqueezed configuration comprises said rope cleaning tool without said inward force applied to said frame assembly. Said squeezed configuration comprises said rope cleaning tool with said inward force applied to a portion of said frame assembly. Said inward force compress a portion of said one or more wiper disks around said central portion, and can cause said wiping aperture to compress around said central portion. Said rope cleaning tool is configured to clean said rope by selectively receiving a portion of said rope by sliding a portion of said rope in said receiver slot and into said wiping aperture, squeezing said frame assembly together using said inward force, pressing said plurality of radial slots against a portion of said rope, and pulling said rope through said wiping aperture to clear of debris from said rope.

Said rope cleaning tool for cleaning said rope. Said rope cleaning tool comprises said one or more wiper disks and said frame assembly. Said frame assembly comprises said first shell portion and said second shell portion, and said plurality of fasteners. Said plurality of fasteners comprise at least said first fastener, and each comprise said first fastener portion and said second fastener portion. Said frame assembly is attached to a portion of said one or more wiper disks using a portion of said plurality of fasteners. Each among said frame assembly comprises said enclosed end and said open end. Said one or more wiper disks comprises said receiver slot and said wiping aperture. Said receiver slot is aligned with said open end of said frame assembly. Said receiver slot and said wiping aperture comprises a cut in said one or more wiper disks allowing an object to pass through said receiver slot and slide into said wiping aperture without disassembling said rope cleaning tool.

Said rope cleaning tool for cleaning said rope. Said rope cleaning tool comprises said one or more wiper disks and said frame assembly. Said frame assembly comprises said first shell portion and said second shell portion, and said plurality of fasteners. Said plurality of fasteners comprise at least said first fastener, and each comprise said first fastener portion and said second fastener portion. Said frame assembly is attached to a portion of said one or more wiper disks using a portion of said plurality of fasteners. Each among said frame assembly comprises said enclosed end and said open end. Said one or more wiper disks comprises said receiver slot and said wiping aperture. Said receiver slot is aligned with said open end of said frame assembly. Said receiver slot and said wiping aperture comprises a cut in said one or more wiper disks allowing an object to pass through said receiver slot and slide into said wiping aperture without disassembling said rope cleaning tool. Said one or more wiper disks comprises a wiper thickness. Said rope cleaning tool is configured to receive said one or more wiper disks in a range of said wiper thickness. Said wiper thickness falls within the range of 3 mm or 3 cm.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
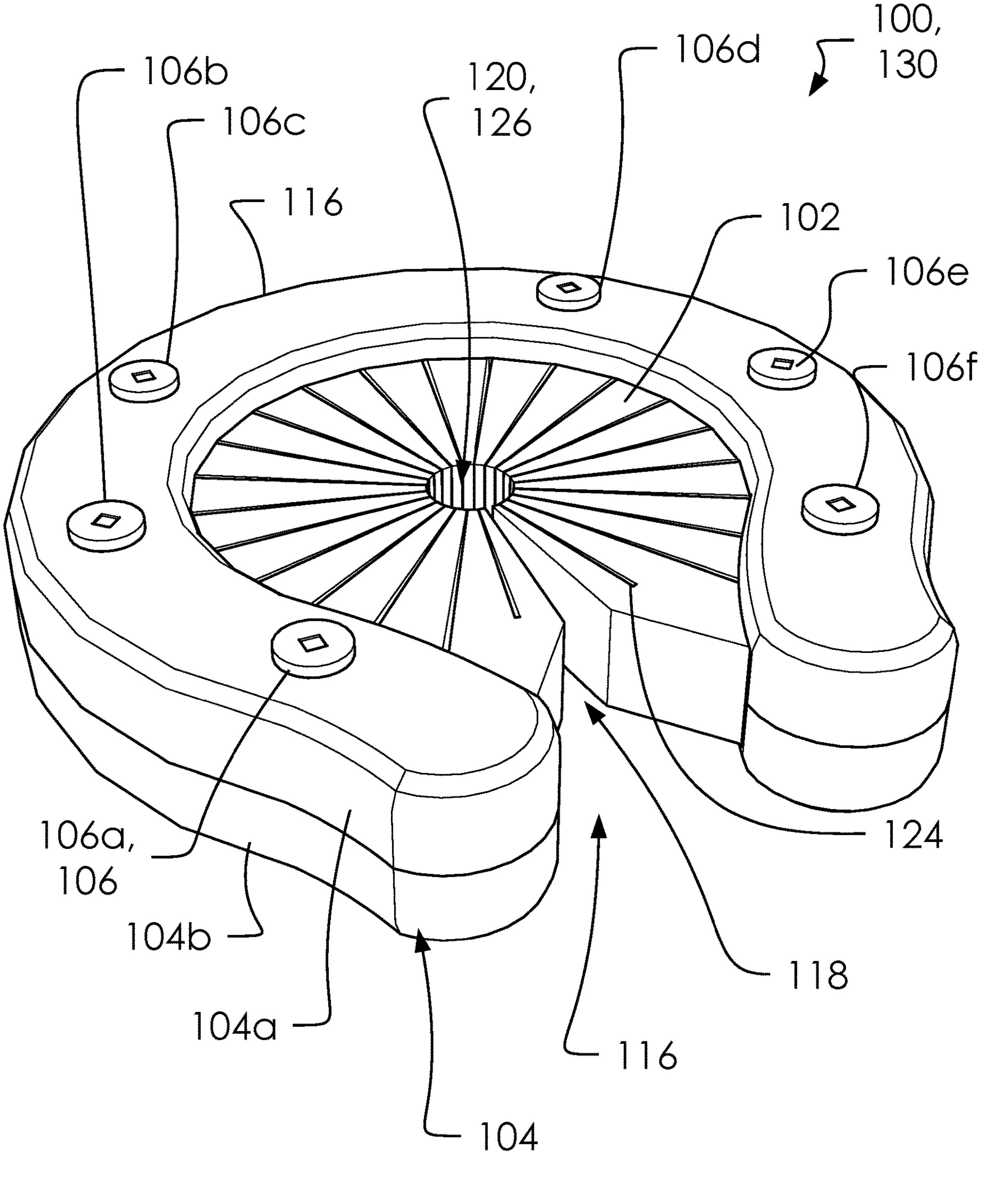
FIG. 1 illustrates a perspective overview of a rope cleaning tool 100 in an unsqueezed configuration 130.

FIG. 1 illustrates a perspective overview of a rope cleaning tool 100 in an unsqueezed configuration 130.

In one embodiment, said rope cleaning tool 100 can comprise one or more wiper disks 102, a frame assembly 104, and a plurality of fasteners 106.

Said frame assembly 104 can comprise a first shell portion 104*a* and a second shell portion 104*b*.

Said plurality of fasteners 106 can comprise a first fastener 106*a*, a second fastener 106*b*, a third fastener 106*c*, a fourth fastener 106*d*, a fifth fastener 106*e* and a sixth fastener 106*f*.

In one embodiment, said frame assembly 104 can comprise an enclosed end 114 and an open end 116. In one embodiment, said frame assembly 104 can comprise a horseshoe shape, as illustrated.

In one embodiment, said one or more wiper disks 102 can comprise a receiver slot 118 and a wiping aperture 120. Said receiver slot 118 can be arranged at said open end 116 of said frame assembly 104.

In one embodiment, said receiver slot 118 and said wiping aperture 120 can comprise a cut in said one or more wiper disks 102 allowing an object to pass through said receiver slot 118 and slide into said wiping aperture 120 without disassembling said rope cleaning tool 100.

Said one or more wiper disks 102 can further comprise a plurality of radial slots 124 arranged around a central portion 126 of said wiping aperture 120. In one embodiment, said plurality of radial slots 124 can comprise a circular shape.

Said plurality of radial slots 124 can extend outward from said central portion 126 toward said frame assembly 104. In one embodiment, said plurality of radial slots 124 can be configured to allow said one or more wiper disks 102 to be deformed when squeezing said frame assembly 104.

Figure 2A:
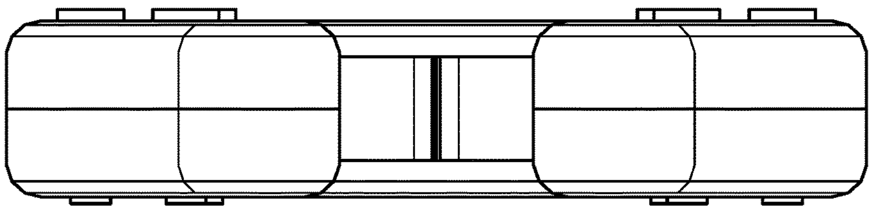
FIGS. 2A and 2B illustrate an elevated front and top view of said rope cleaning tool 100 in said unsqueezed configuration 130.
Figure 2B:
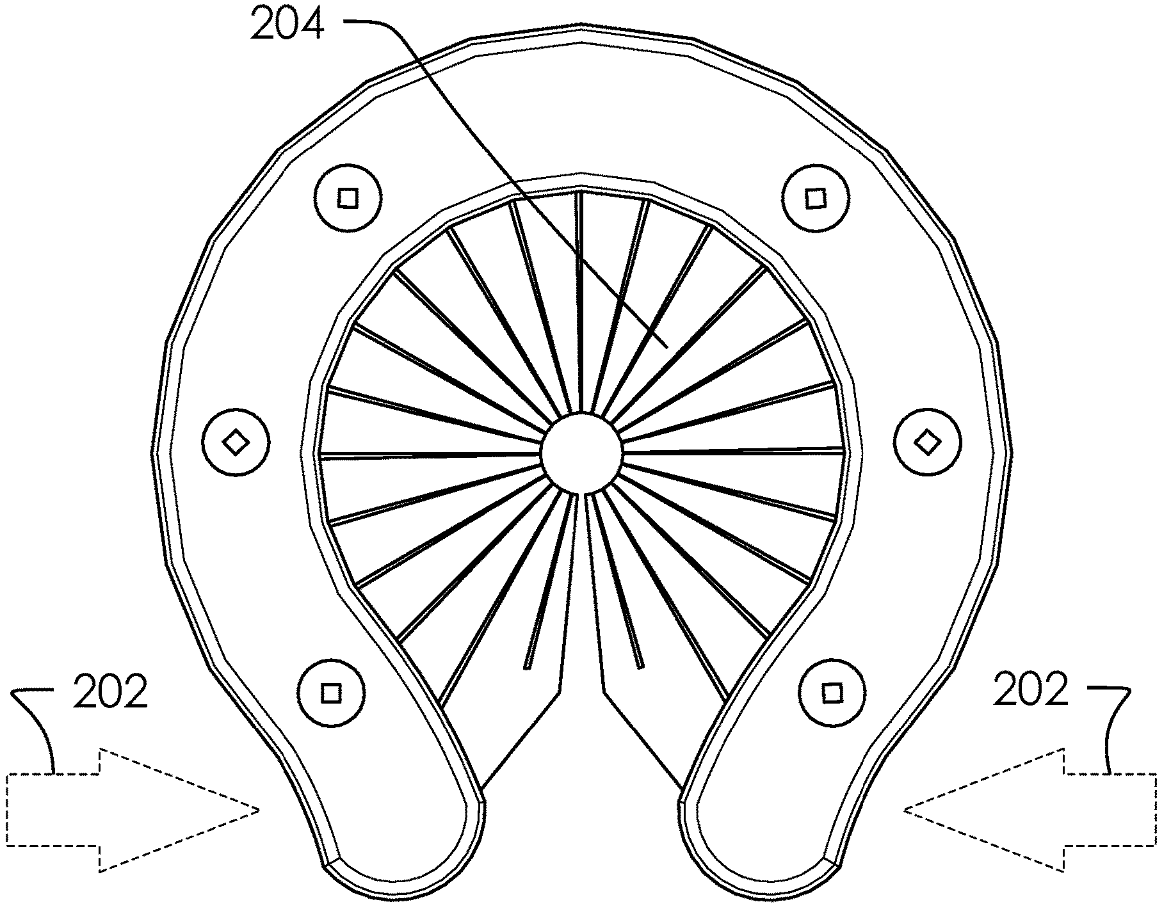

FIGS. 2A and 2B illustrate an elevated front and top view of said rope cleaning tool 100 in said unsqueezed configuration 130.

In one embodiment, said unsqueezed configuration 130 can comprise said rope cleaning tool 100 without an inward force 202 applied to said frame assembly 104, and a squeezed configuration 300 can comprise said rope cleaning tool 100 with said inward force 202 applied to a portion of said frame assembly 104.

Said one or more wiper disks 102 can comprise a plurality of bristles 204 comprising portions of said one or more wiper disks 102 between said plurality of radial slots 124. In one embodiment, each among said plurality of bristles 204 can be configured for cleaning objects in said wiping aperture 120.

Figure 3:
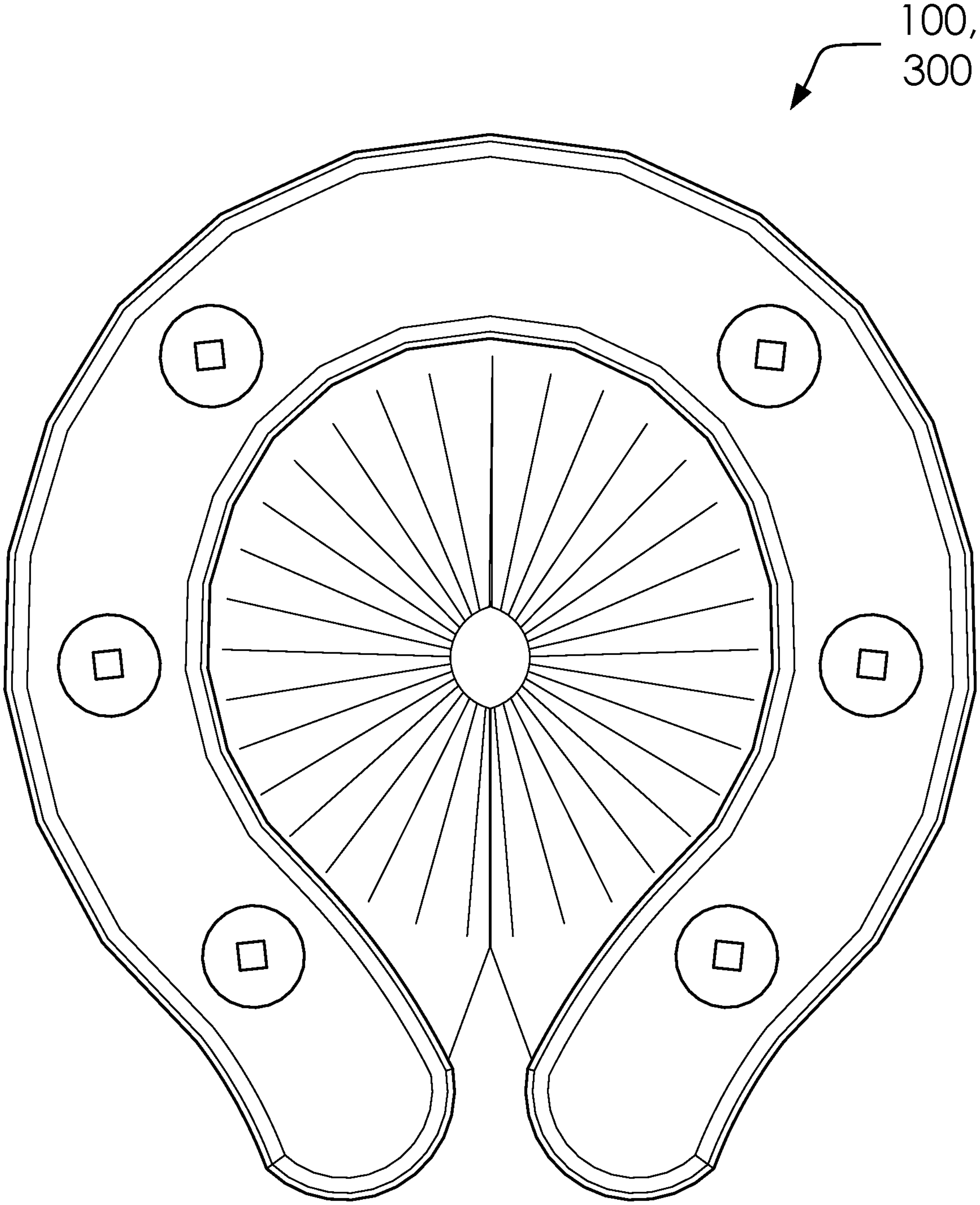
FIG. 3 illustrates an elevated top view of said rope cleaning tool 100 in said squeezed configuration 300.

FIG. 3 illustrates an elevated top view of said rope cleaning tool 100 in said squeezed configuration 300.

Said rope cleaning tool 100 can comprise said unsqueezed configuration 130 and said squeezed configuration 300; wherein, said squeezed configuration 300 can comprise a portion of said frame assembly 104 compressed by said inward force 202.

In one embodiment, said inward force 202 can compress a portion of said one or more wiper disks 102 around said central portion 126, and can cause said wiping aperture 120 of said open end 116 of each said frame assembly 104 to move toward one another, as illustrated.

Figure 4:
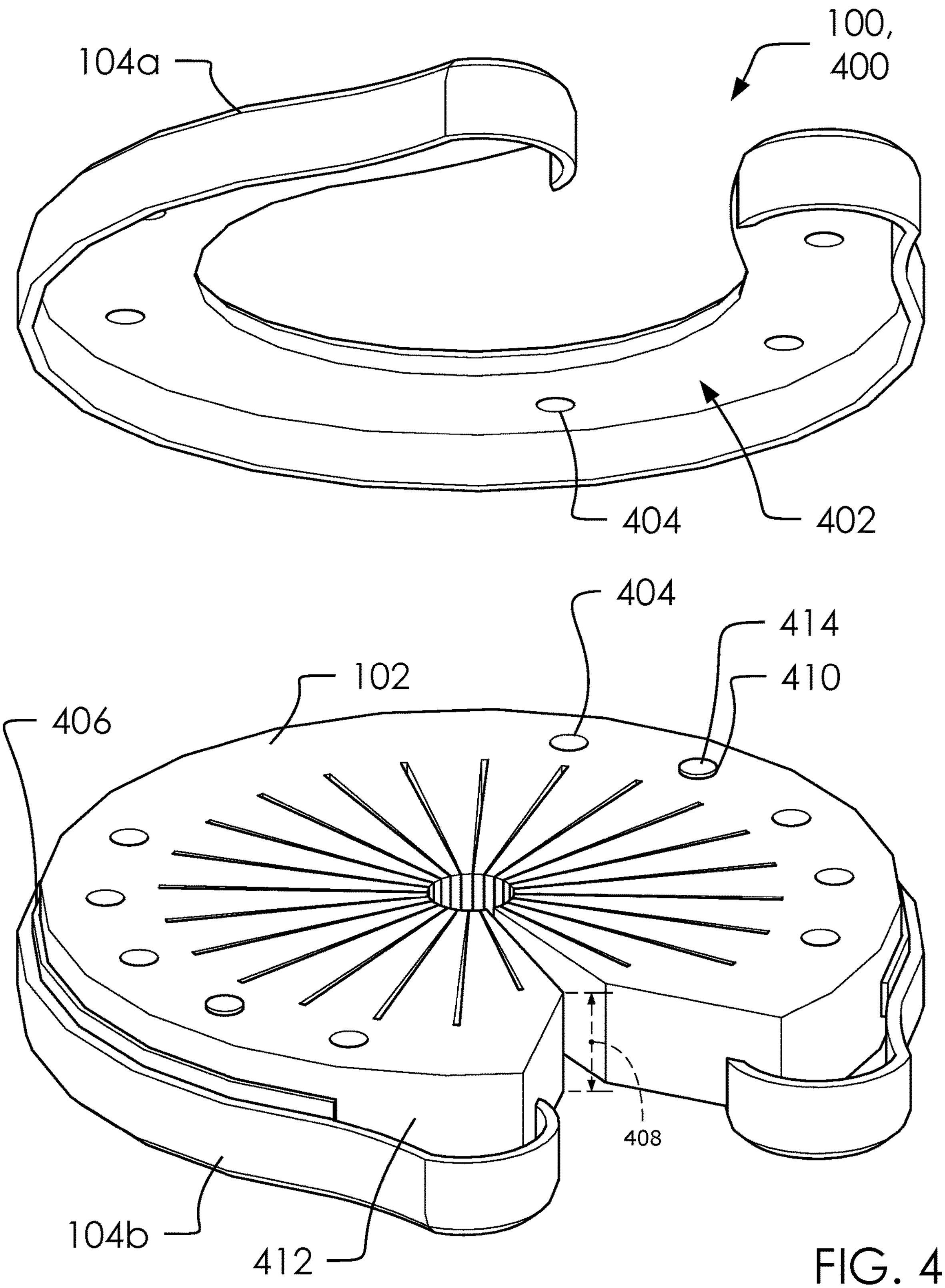
FIGS. 4 and 5 illustrates a perspective overview of said rope cleaning tool 100 in an open configuration 400 with and without said one or more wiper disks 102, respectively.
Figure 5:
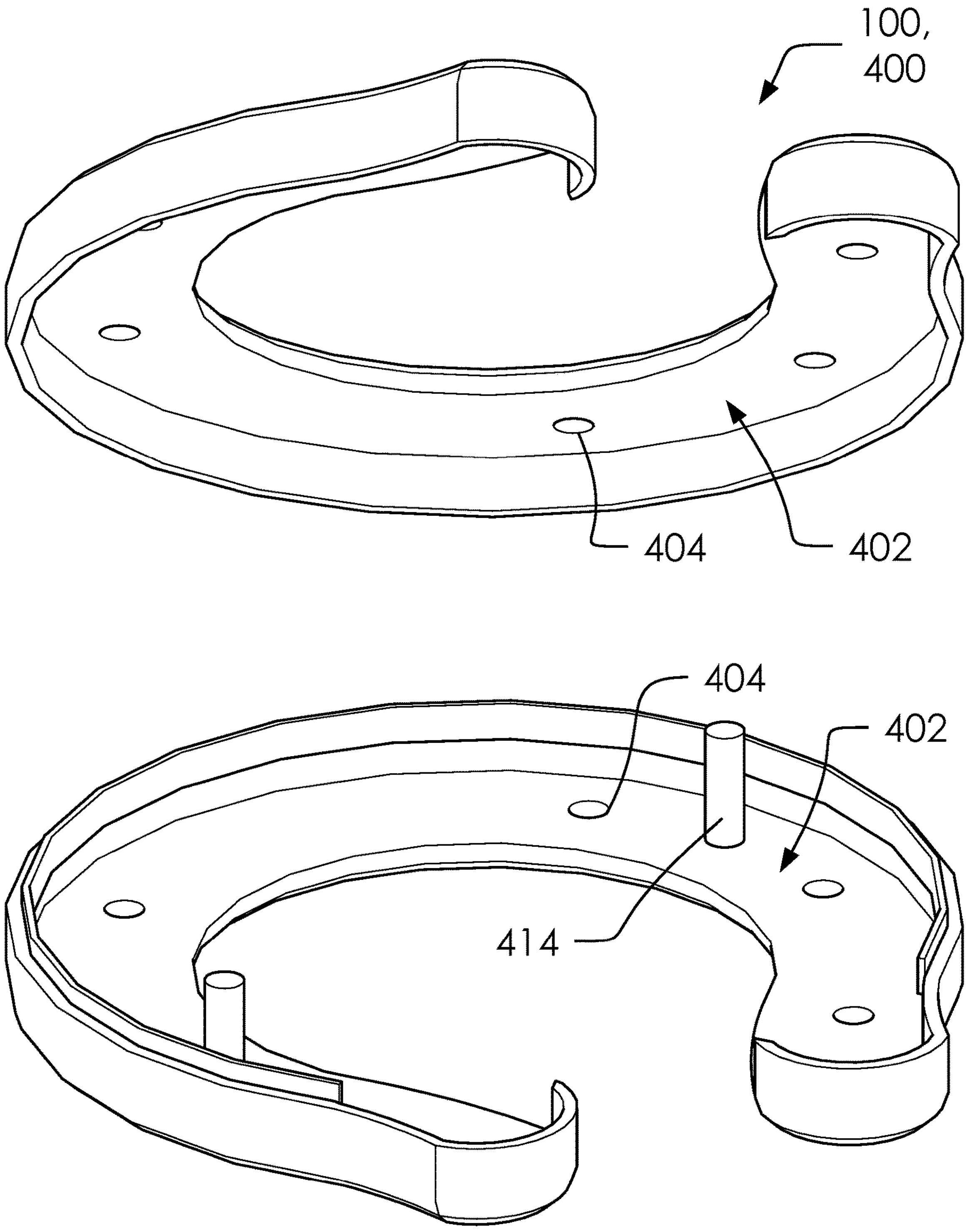

FIGS. 4 and 5 illustrates a perspective overview of said rope cleaning tool 100 in an open configuration 400 with and without said one or more wiper disks 102, respectively.

In one embodiment, said frame assembly 104 can comprise a wiper aperture 402.

In one embodiment, said one or more wiper disks 102, said first shell portion 104*a* and said second shell portion 104*b* can comprise a plurality of fastener apertures 404 being aligned with said plurality of fasteners 106. Wherein, said plurality of fasteners 106 can each slide through one among said plurality of fastener apertures 404 of said first shell portion 104*a*, said one or more wiper disks 102 and said second shell portion 104*b* and hold said one or more wiper disks 102 within said wiper aperture 402.

Said one or more wiper disks 102 can further comprise one or more post apertures 410; wherein, said one or more post apertures 410 and said plurality of fastener apertures 404 can be arranged about a perimeter of said one or more wiper disks 102 between said plurality of radial slots 124 and an exterior edge 412 of said one or more wiper disks 102. In one embodiment, said rope cleaning tool 100 can further comprise one or more posts 414. Wherein, said one or more posts 414 can support said first shell portion 104*a* and said second shell portion 104*b* from collapsing inward at said wiper aperture 402.

In one embodiment, one among said first shell portion 104*a* and said second shell portion 104*b* can comprise an inner diameter lip 406 at least partially within said wiper aperture 402 and keeping said first shell portion 104*a* and said second shell portion 104*b* aligned.

In one embodiment, said rope cleaning tool 100 is configured to use and replace said one or more wiper disks 102 to ensure said rope cleaning tool 100 remains useful for its design specification. For example, said rope cleaning tool 100 can comprise a plurality of said one or more wiper disks

102 comprising different materials such as stiffer and softer plastics, with less sharp points on said plurality of bristles 204. In one embodiment, said one or more wiper disks 102 can be a wearable part and therefore replaceable when worn out.

In one embodiment, said one or more wiper disks 102 can comprise a wiper thickness 408. Said rope cleaning tool 100 can be configured to receive said one or more wiper disks 102 in a range of said wiper thickness 408. For example, said wiper thickness 408 can comprise 3 mm or 3 cm. Such variations can result in different characteristics when cleaning ropes, as well as different wear and tear characteristics over the long haul.

Figure 6:
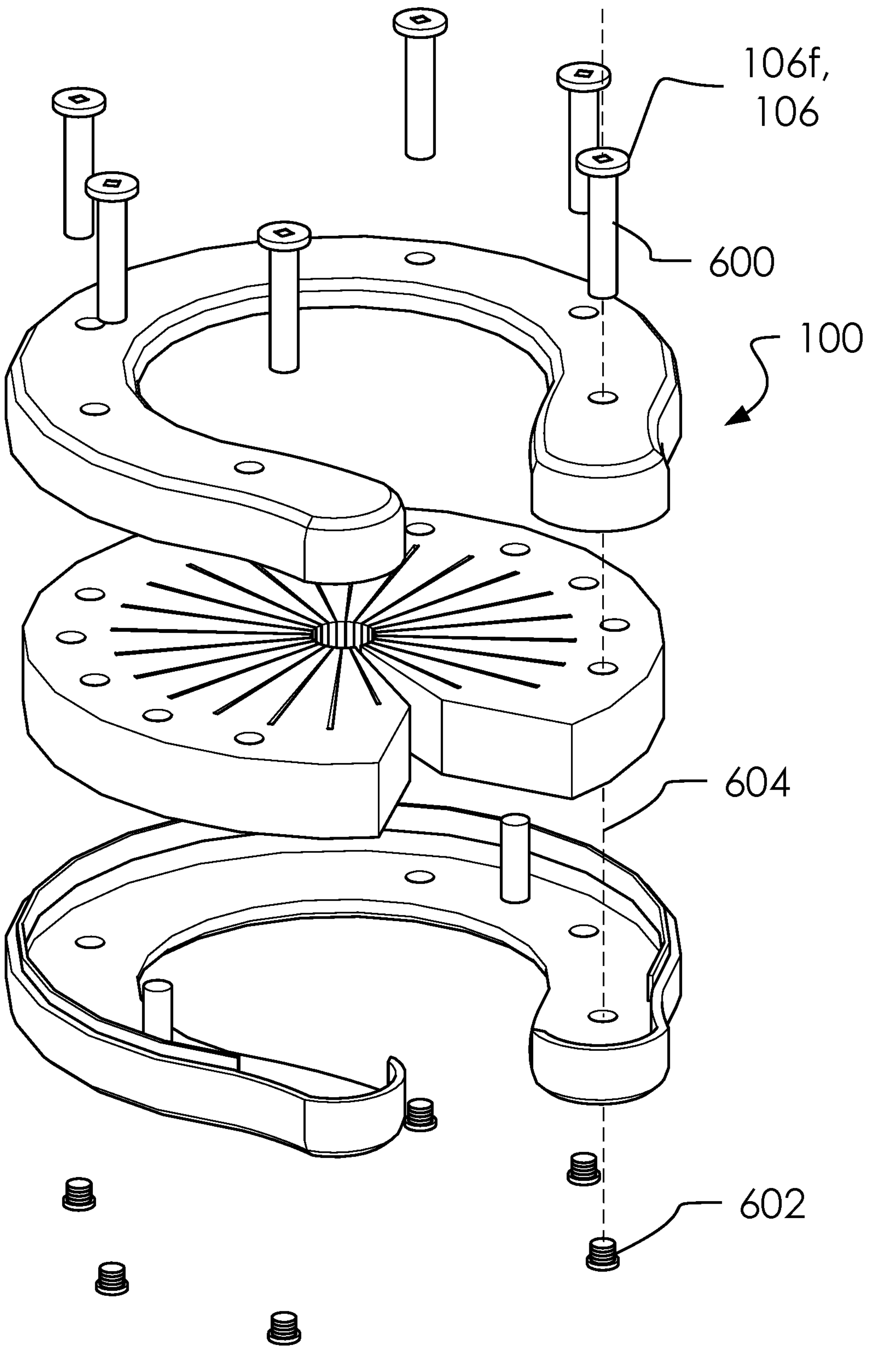
FIGS. 6 and 7 illustrate a top and bottom exploded perspective overview of said rope cleaning tool 100, respectively.
Figure 7:
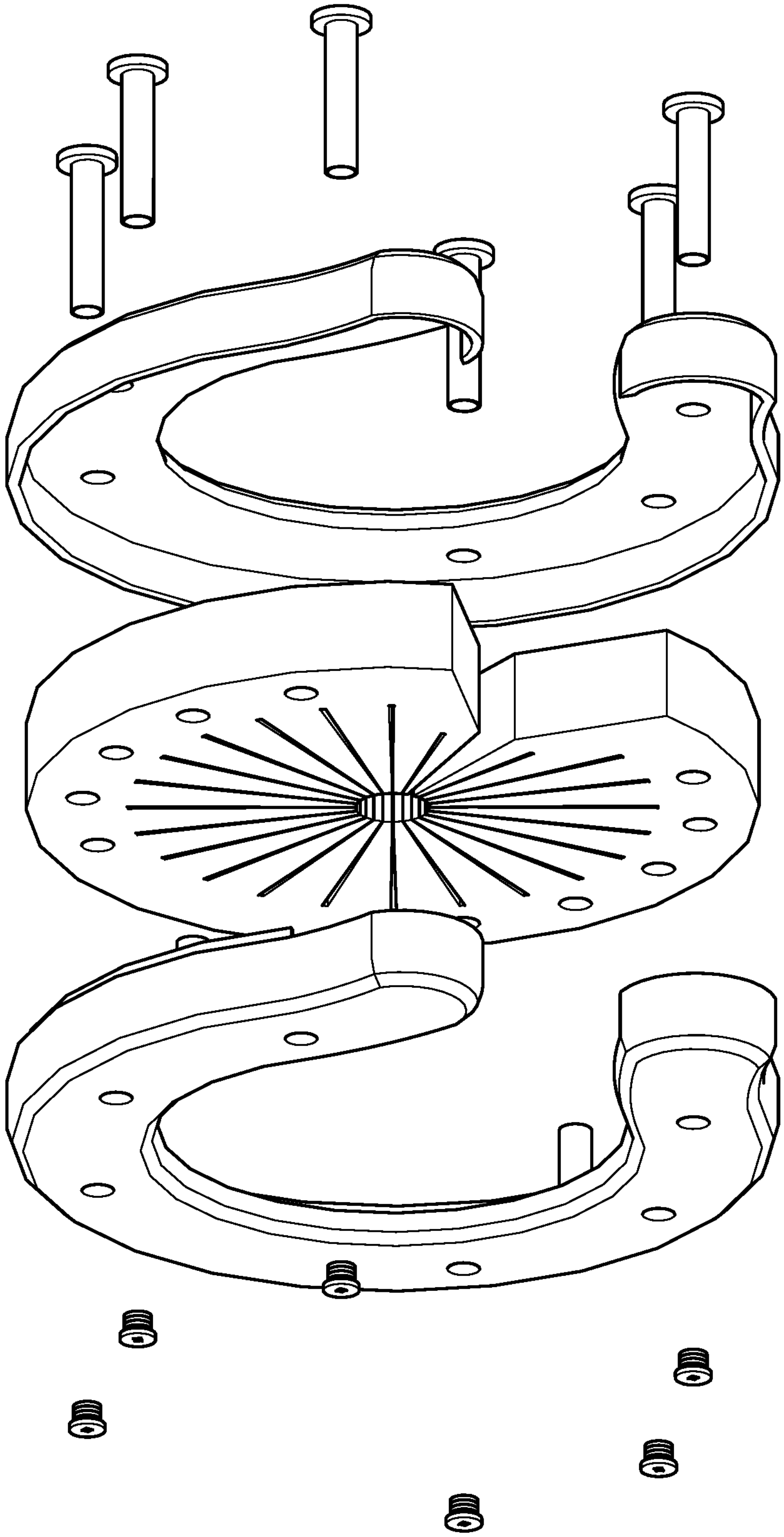

FIGS. 6 and 7 illustrate a top and bottom exploded perspective overview of said rope cleaning tool 100, respectively.

In one embodiment, said plurality of fasteners 106 can each comprise a first fastener portion 600 and a second fastener portion 602. Wherein, said first fastener portion 600 and said second fastener portion 602 can selectively attach to one another on both sides of said frame assembly 104 and through said plurality of fastener apertures 404. In one embodiment, each among said plurality of fasteners 106 can comprise a fastener axis 604, as illustrated.

Figure 8:
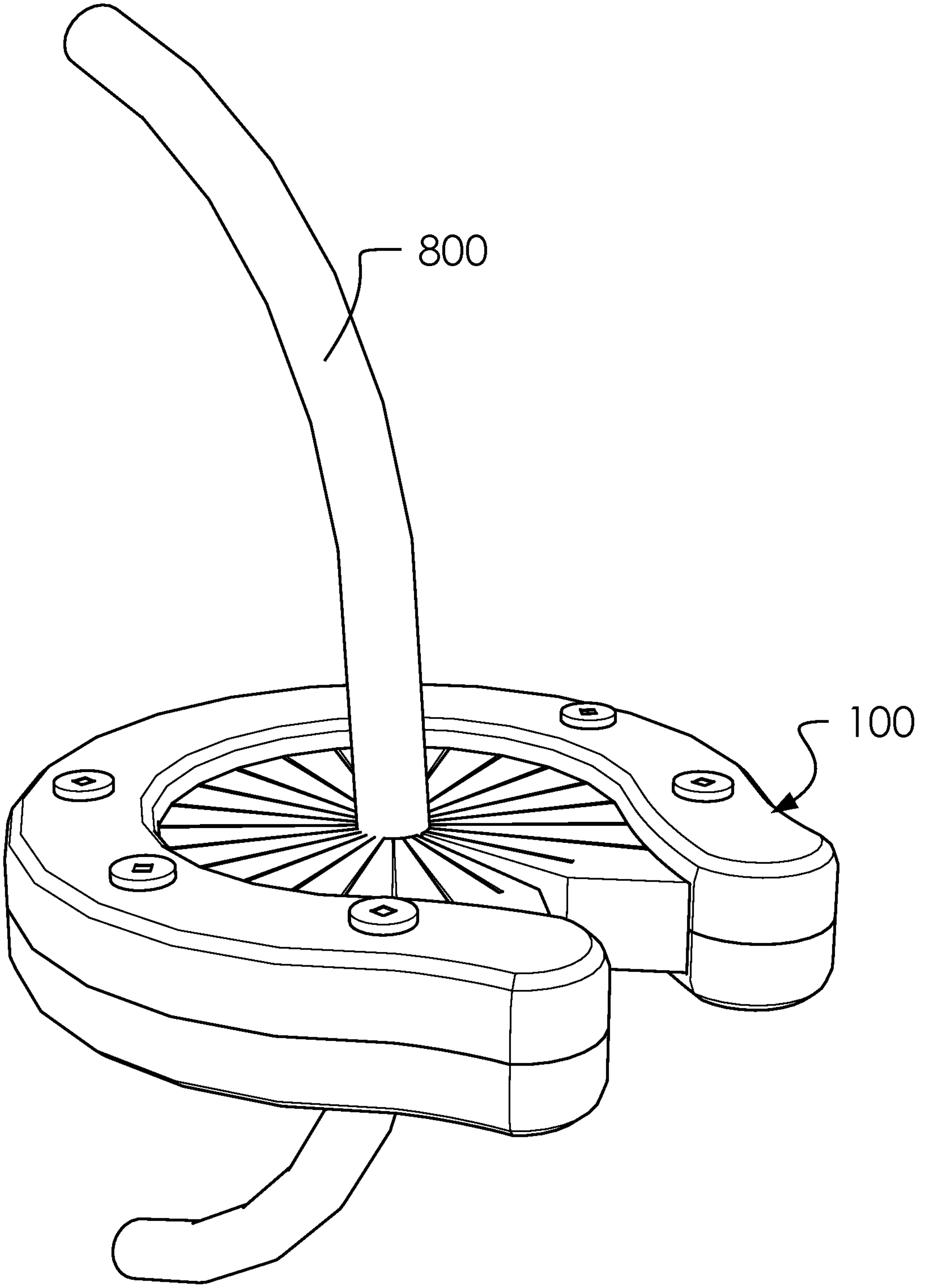
FIG. 8 illustrates a perspective overview of said rope cleaning tool 100 with a rope 800 in said wiping aperture 120 of said one or more wiper disks 102.

FIG. 8 illustrates a perspective overview of said rope cleaning tool 100 with a rope 800 in said wiping aperture 120 of said one or more wiper disks 102.

Said rope cleaning tool 100 can be configured to clean said rope 800 by: selectively receiving a portion of said rope 800 by sliding a portion of said rope 800 in said receiver slot 118 and into said wiping aperture 120, squeezing said frame assembly 104 together using said inward force 202, pressing said plurality of radial slots 124 against a portion of said rope 800, and pulling said rope 800 through said wiping aperture 120 to clear of debris from said rope 800.

Figure 9:
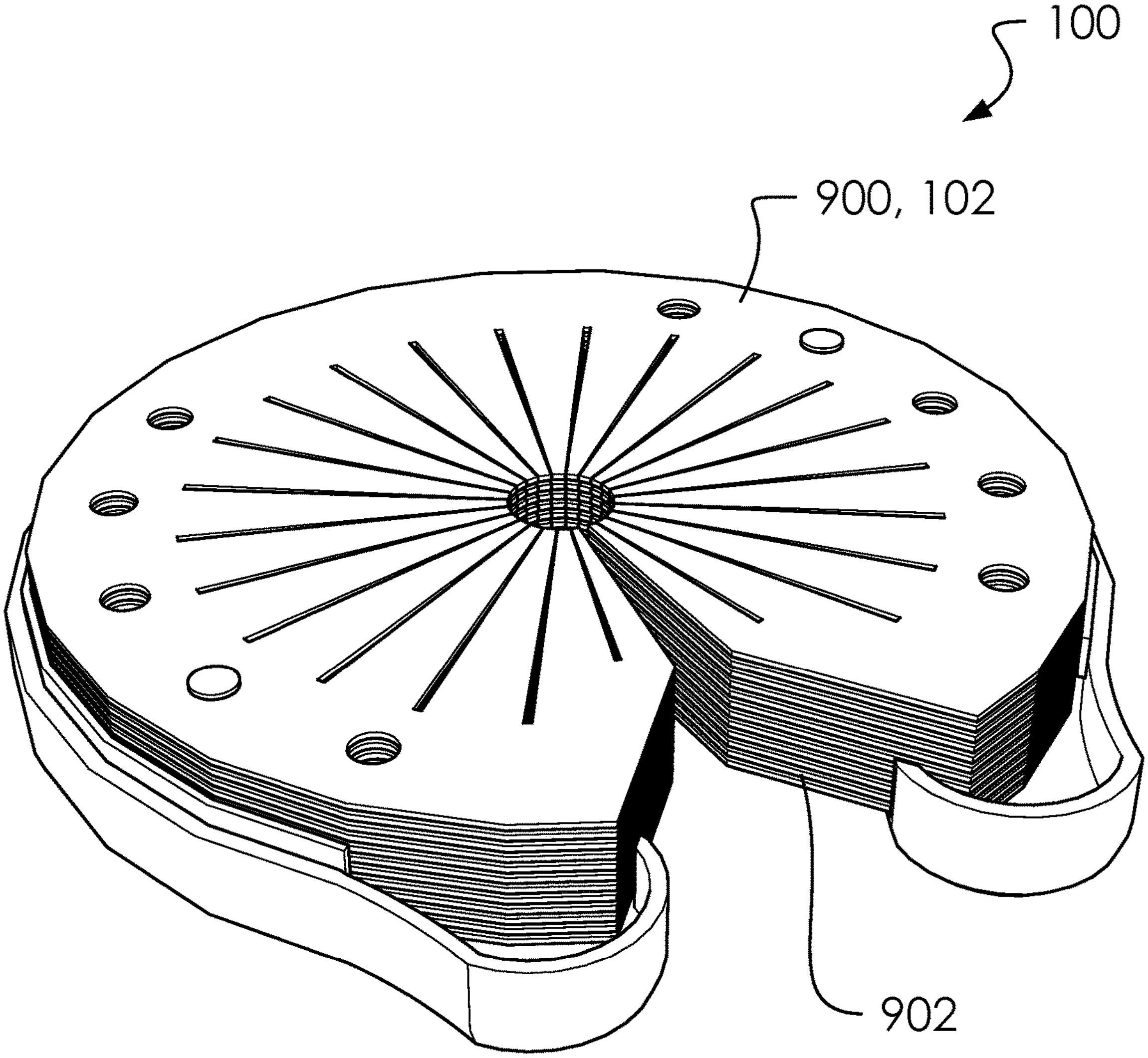
FIGS. 9 and 10 illustrate a perspective overview of said rope cleaning tool 100 with a multi-layer configuration 900 of said one or more wiper disks 102, without and with said first shell portion 104*a*.
Figure 10:
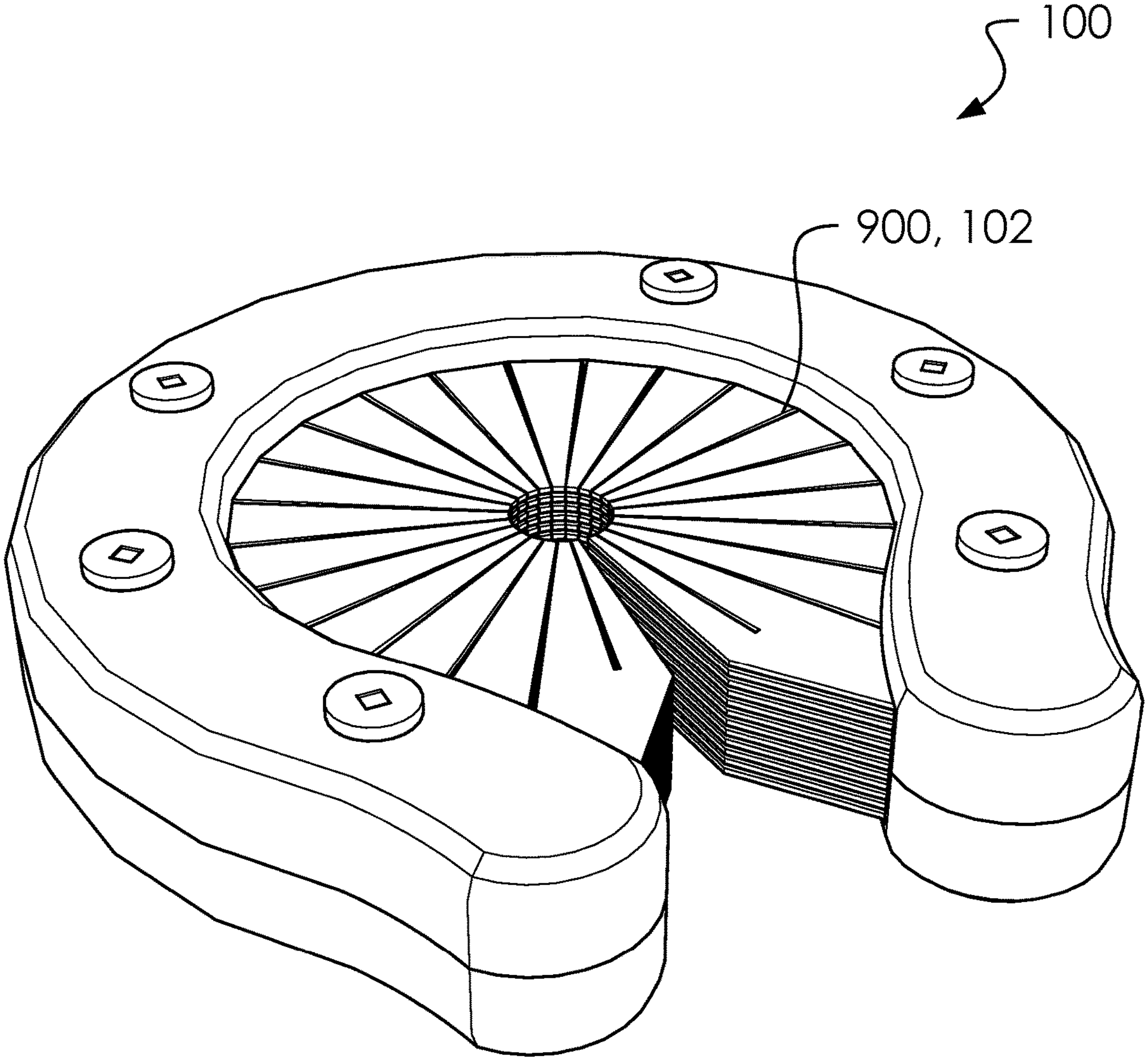

FIGS. 9 and 10 illustrate a perspective overview of said rope cleaning tool 100 with a multi-layer configuration 900 of said one or more wiper disks 102, without and with said first shell portion 104*a*.

Said multi-layer configuration 900 can comprise a plurality of layers 902 of said one or more wiper disks 102.

In one embodiment, said one or more wiper disks 102 can comprise said multi-layer configuration 900, comprising a stack of thinner configurations of said one or more wiper disks 102, wherein each among said multi-layer configuration 900 are aligned according to said plurality of fasteners 106 and said fastener axis 604, as discussed above and illustrated.

In one embodiment, said plurality of layers 902 of said one or more wiper disks 102 can be arranged between said first shell portion 104*a* and said second shell portion 104*b*.

In one embodiment, said one or more wiper disks 102 can comprise a nylon, plastic, 3D printed PLA, or other suitable material according to the design specifications and durability of said rope 800 and said one or more wiper disks 102.

Figure 11:
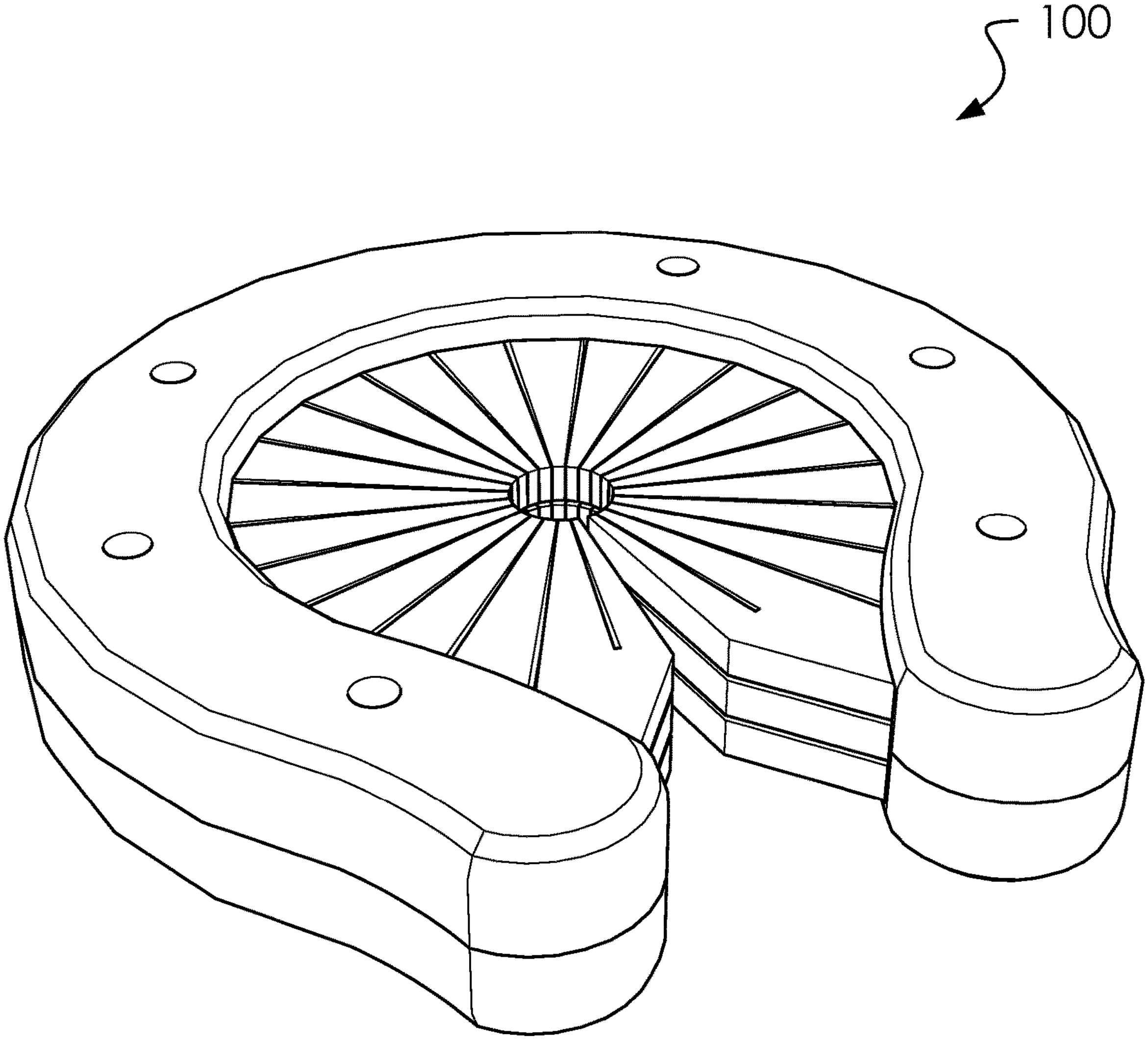
FIGS. 11 and 12 illustrate a perspective overview of said rope cleaning tool 100 with said multi-layer configuration 900 of said one or more wiper disks 102 having 3 layers, with and without said second shell portion 104*b*.
Figure 12:
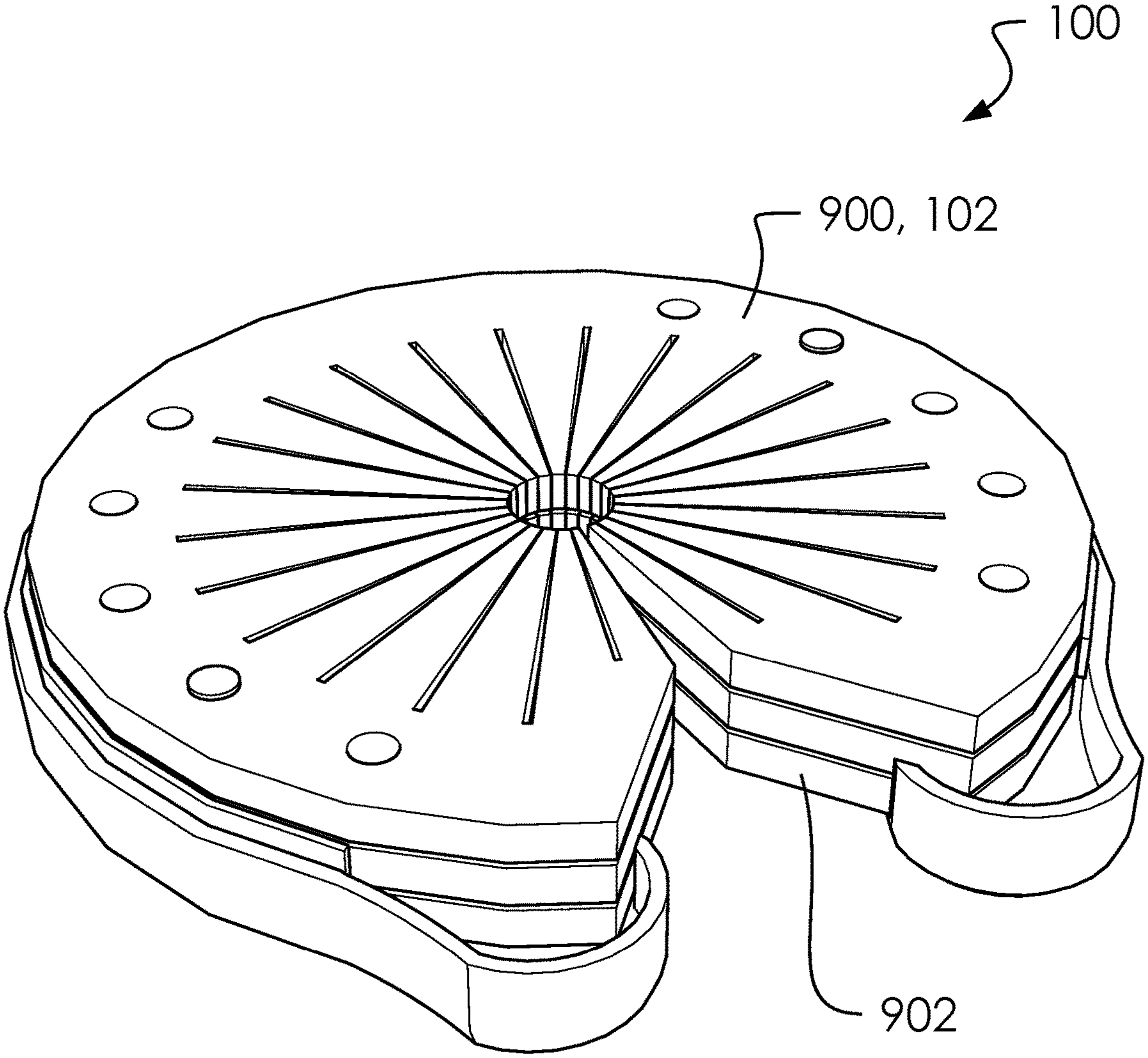

FIGS. 11 and 12 illustrate a perspective overview of said rope cleaning tool 100 with said multi-layer configuration 900 of said one or more wiper disks 102 having 3 layers, with and without said second shell portion 104*b*.

Figure 13:
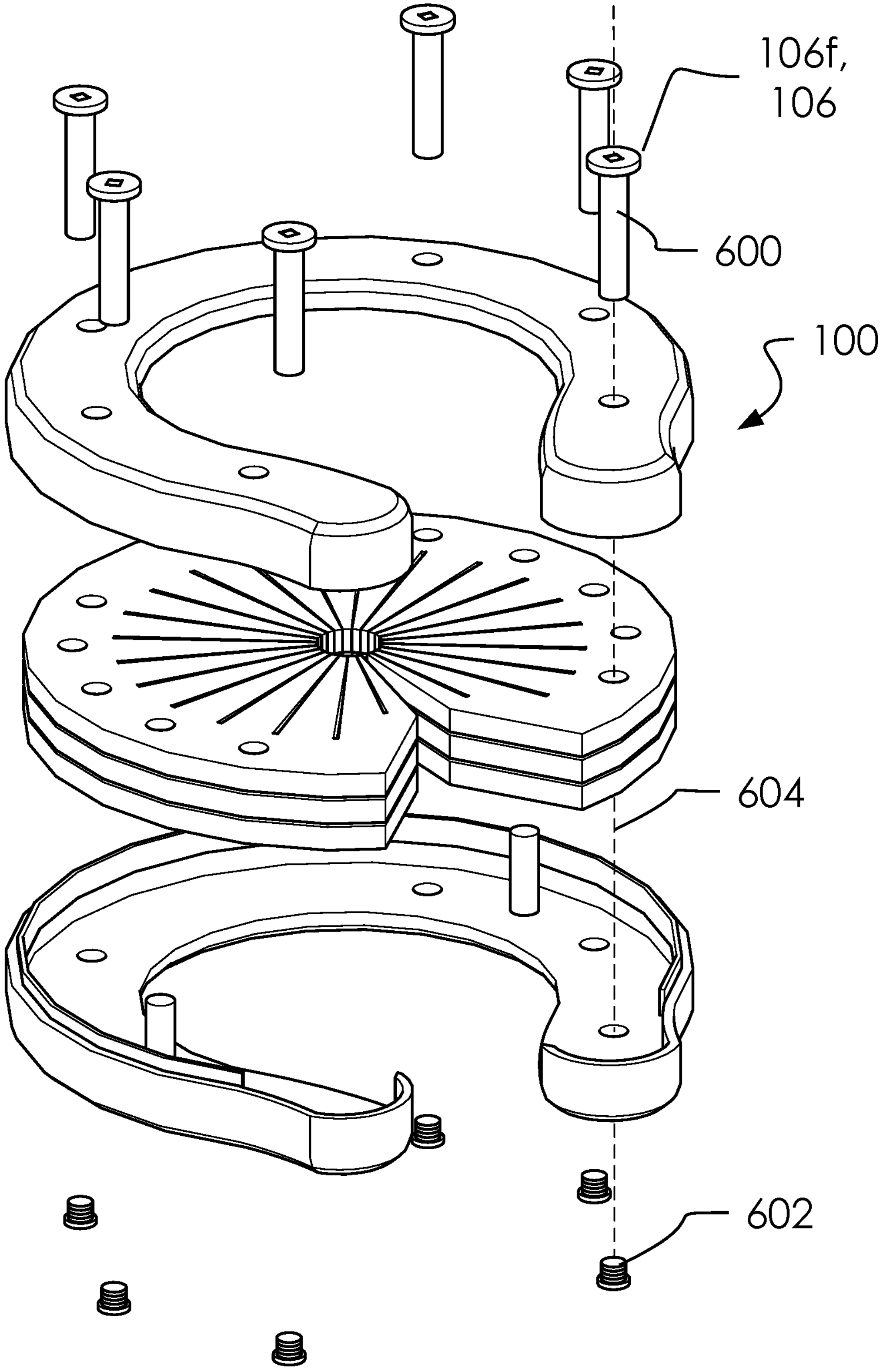
FIG. 13 illustrates an exploded perspective overview of said rope cleaning tool 100 with said one or more wiper disks 102 having 3 layers.

FIG. 13 illustrates an exploded perspective overview of said rope cleaning tool 100 with said one or more wiper disks 102 having 3 layers.

Figure 14:
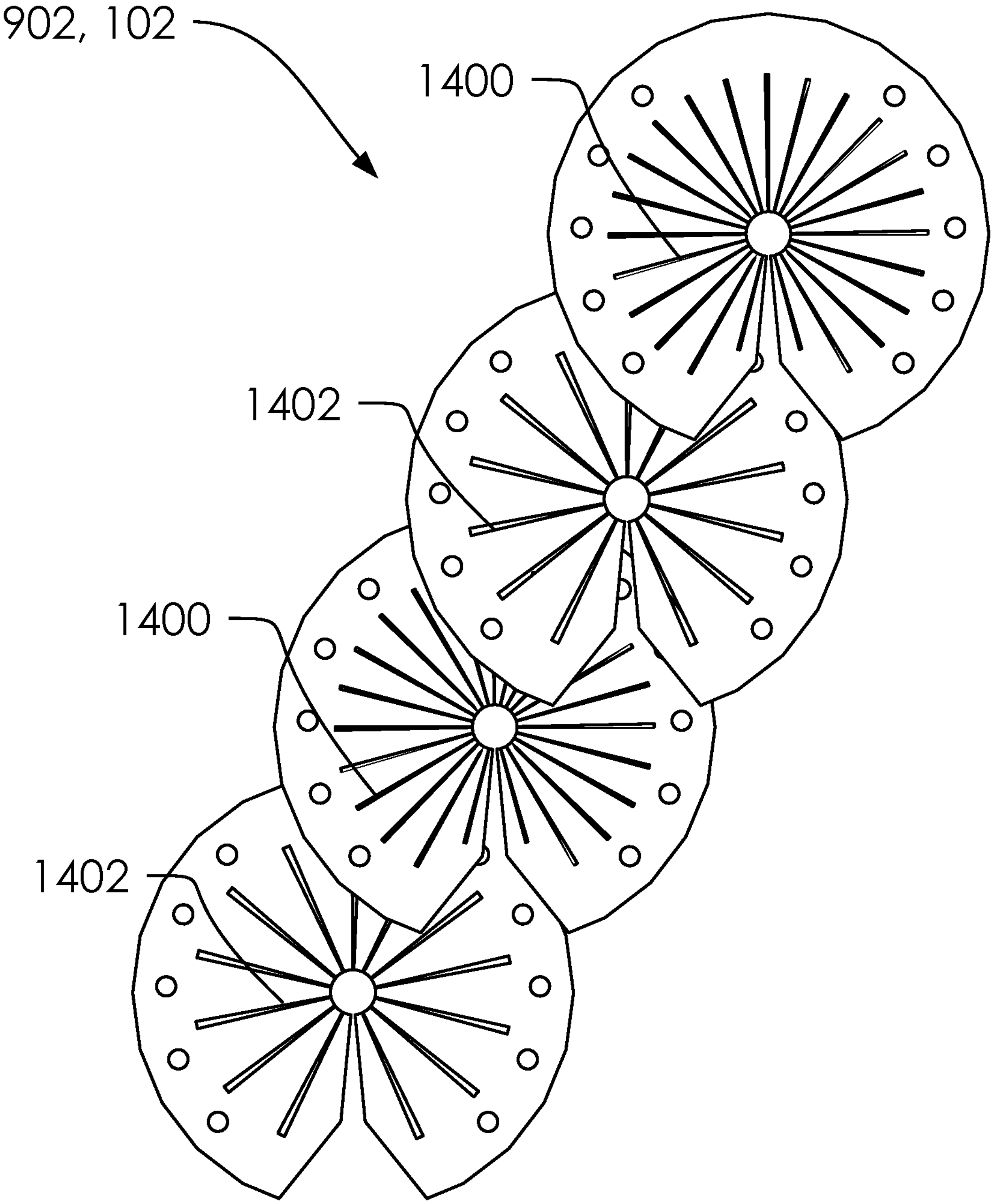
FIG. 14 illustrates an elevated top view of a plurality of said plurality of layers 902 of said one or more wiper disks 102 comprising a first bristle pattern 1400 and a second bristle pattern 1402.
Figure 15A:
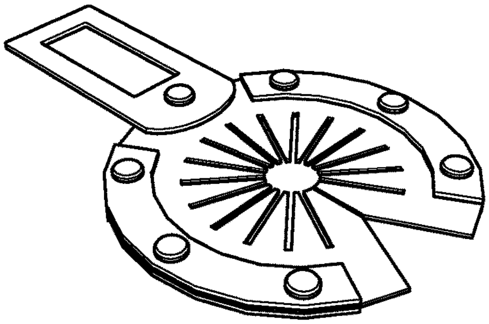
FIGS. 15A, 15B, 15C and 15D illustrate four perspective overviews of a first and second alternative embodiment of said rope cleaning tool 100 as disclosed in the parent application to this filing, U.S. provisional utility patent application No. 63/481,532 filed 2023 Jan. 25.
Figure 15B:
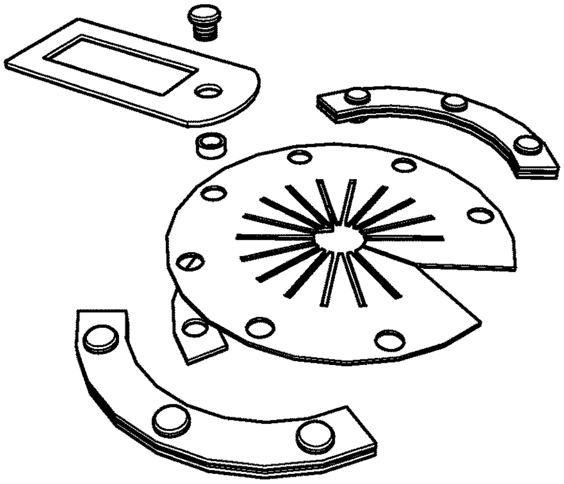
Figure 15C:
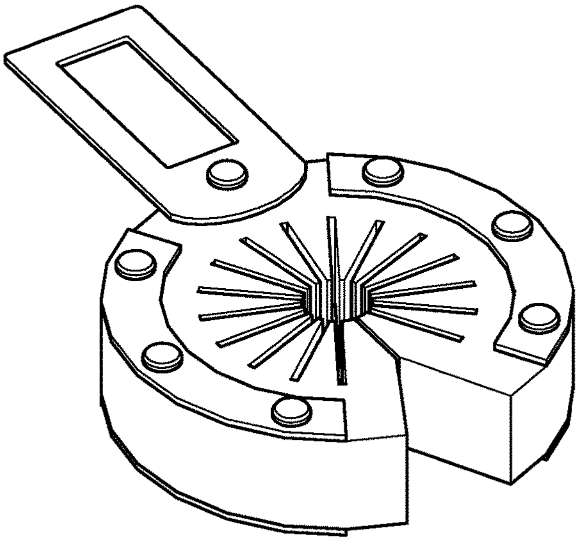
Figure 15D:
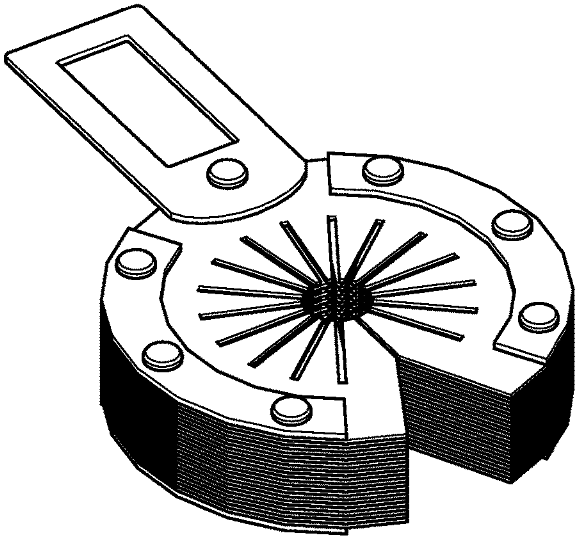

FIG. 14 illustrates an elevated top view of a plurality of said plurality of layers 902 of said one or more wiper disks 102 comprising a first bristle pattern 1400 and a second bristle pattern 1402.

In one embodiment, each layer in said plurality of layers 902 can comprise different rotary arrangements of said plurality of bristles 204, such as said first bristle pattern 1400 and said second bristle pattern 1402, relative to said central portion 126 of said wiping aperture 120 and configured for applying an uneven pressure on said rope 800 as it is pulled through said wiping aperture 120.

FIGS. 15A, 15B, 15C and 15D illustrate four perspective overviews of a first and second alternative embodiment of said rope cleaning tool 100 as disclosed in the parent application to this filing, U.S. provisional utility patent application No. 63/481,532 filed 2023 Jan. 25.

A parts list with reference to the original parts follows.

Said rope cleaning tool 100,
said unsqueezed configuration 130,
said one or more wiper disks 102,
said frame assembly 104,
said plurality of fasteners 106,
said first shell portion 104*a*,
said second shell portion 104*b*,
said first fastener 106*a*,
said second fastener 106*b*,
said third fastener 106*c*,
said fourth fastener 106*d*,
said fifth fastener 106*e*,
said sixth fastener 106*f*,
said enclosed end 114,
said open end 116,
said receiver slot 118,
said wiping aperture 120,
said plurality of radial slots 124,
said central portion 126,
said inward force 202,
said squeezed configuration 300,
said plurality of bristles 204,
said open configuration 400,
said wiper aperture 402,
said plurality of fastener apertures 404,
said inner diameter lip 406,
said wiper thickness 408,
said first fastener portion 600,
said second fastener portion 602,
said fastener axis 604,
said rope 800,
said multi-layer configuration 900, and
said plurality of layers 902.

A preferred embodiment with reference to the original claims follows.

Said rope cleaning tool 100 for cleaning said rope 800. Said rope cleaning tool 100 comprises said one or more wiper disks 102 and said frame assembly 104. Said frame assembly 104 comprises said first shell portion 104*a* and said second shell portion 104*b*, and said plurality of fasteners 106. Said plurality of fasteners 106 comprise at least said first fastener 106*a*, and each comprise said first fastener portion 600 and said second fastener portion 602. Said frame assembly 104 can be attached to a portion of said one or more wiper disks 102 using a portion of said plurality of fasteners 106. Each among said frame assembly 104 comprises said enclosed end 114 and said open end 116. Said one or more wiper disks 102 comprises said receiver slot 118 and said wiping aperture 120. Said receiver slot 118 can be aligned with said open end 116 of said frame assembly 104. Said receiver slot 118 and said wiping aperture 120 comprises a cut in said one or more wiper disks 102 allowing an object to pass through said receiver slot 118 and slide into said wiping aperture 120 without disassembling said rope cleaning tool 100. Said wiping aperture 120 can further comprise said central portion 126 and said plurality of radial slots 124 arranged around said central portion 126. Said central portion 126 comprises a round shape. Said plurality of radial slots 124 extend outward from said central portion 126 toward said frame assembly 104. Said plurality of radial slots 124 can be configured to allow said one or more wiper disks 102 to be deformed when squeezing said frame assembly 104 with said inward force 202. Said one or more wiper disks 102 comprises said plurality of bristles 204 comprising portions of said one or more wiper disks 102 between said plurality of radial slots 124. Each among said plurality of bristles 204 can be configured for cleaning objects in said wiping aperture 120. Said rope cleaning tool 100 comprises said unsqueezed configuration 130 and said squeezed configuration 300. Said unsqueezed configuration 130 comprises said rope cleaning tool 100 without said inward force 202 applied to said frame assembly 104. Said squeezed configuration 300 comprises said rope cleaning tool 100 with said inward force 202 applied to a portion of said frame assembly 104. Said inward force 202 compress a portion of said one or more wiper disks 102 around said central portion 126, and can cause said wiping aperture 120 to compress around said central portion 126. Said rope cleaning tool 100 can be configured to clean said rope 800 by selectively receiving a portion of said rope 800 by sliding a portion of said rope 800 in said receiver slot 118 and into said wiping aperture 120, squeezing said frame assembly 104 together using said inward force 202, pressing said plurality of radial slots 124 against a portion of said rope 800, and pulling said rope 800 through said wiping aperture 120 to clear of debris from said rope 800.

Said rope cleaning tool 100 for cleaning said rope 800. Said rope cleaning tool 100 comprises said one or more wiper disks 102 and said frame assembly 104. Said frame assembly 104 comprises said first shell portion **104*a* and said second shell portion 104*b*, and said plurality of fasteners 106. Said plurality of fasteners 106 comprise at least said first fastener 106*a*, and each comprise said first fastener portion 600 and said second fastener portion 602. Said frame assembly 104 can be attached to a portion of said one or more wiper disks 102 using a portion of said plurality of fasteners 106. Each among said frame assembly 104 comprises said enclosed end 114 and said open end 116. Said one or more wiper disks 102 comprises said receiver slot 118 and said wiping aperture 120. Said receiver slot 118 can be aligned with said open end 116 of said frame assembly 104. Said receiver slot 118 and said wiping aperture 120 comprises a cut in said one or more wiper disks 102 allowing an object to pass through said receiver slot 118 and slide into said wiping aperture 120 without disassembling said rope cleaning tool 100. Said wiping aperture 120 can further comprise said central portion 126 and said plurality of radial slots 124 arranged around said central portion 126. Said central portion 126 comprises a round shape. Said plurality of radial slots 124 extend outward from said central portion 126 toward said frame assembly 104. Said plurality of radial slots 124 can be configured to allow said one or more wiper disks 102 to be deformed when squeezing said frame assembly 104 with said inward force 202. Said one or more wiper disks 102 comprises said plurality of bristles 204 comprising portions of said one or more wiper disks 102 between said plurality of radial slots 124. Each among said plurality of bristles 204 can be configured for cleaning objects in said wiping aperture 120. Said rope cleaning tool 100 comprises said unsqueezed configuration 130 and said squeezed configuration 300. Said unsqueezed configuration 130 comprises said rope cleaning tool 100 without said inward force 202 applied to said frame assembly 104. Said squeezed configuration 300 comprises said rope cleaning tool 100 with said inward force 202 applied to a portion of said frame assembly 104. Said inward force 202 compress a portion of said one or more wiper disks 102 around said central portion 126, and can cause said wiping aperture 120 to compress around said central portion 126. Said rope cleaning tool 100 can be configured to clean said rope 800 by selectively receiving a portion of said rope 800 by sliding a portion of said rope 800 in said receiver slot 118 and into said wiping aperture 120, squeezing said frame assembly 104 together using said inward force 202, pressing said plurality of radial slots 124 against a portion of said rope 800, and pulling said rope 800 through said wiping aperture 120 to clear of debris from said rope 800**.

Said rope cleaning tool 100 for cleaning said rope 800. Said rope cleaning tool 100 comprises said one or more wiper disks 102 and said frame assembly 104. Said frame assembly 104 comprises said first shell portion **104*a* and said second shell portion 104*b*, and said plurality of fasteners 106. Said plurality of fasteners 106 comprise at least said first fastener 106*a*, and each comprise said first fastener portion 600 and said second fastener portion 602. Said frame assembly 104 can be attached to a portion of said one or more wiper disks 102 using a portion of said plurality of fasteners 106. Each among said frame assembly 104 comprises said enclosed end 114 and said open end 116. Said one or more wiper disks 102 comprises said receiver slot 118 and said wiping aperture 120. Said receiver slot 118 can be aligned with said open end 116 of said frame assembly 104. Said receiver slot 118 and said wiping aperture 120 comprises a cut in said one or more wiper disks 102 allowing an object to pass through said receiver slot 118 and slide into said wiping aperture 120 without disassembling said rope cleaning tool 100**.

Said wiping aperture 120 can further comprise said central portion 126 and said plurality of radial slots 124 arranged around said central portion 126. Said central portion 126 comprises a round shape. Said plurality of radial slots 124 extend outward from said central portion 126 toward said frame assembly 104. Said plurality of radial slots 124 can be configured to allow said one or more wiper disks 102 to be deformed when squeezing said frame assembly 104 with said inward force 202. Said one or more wiper disks 102 comprises said plurality of bristles 204 comprising portions of said one or more wiper disks 102 between said plurality of radial slots 124. Each among said plurality of bristles 204 can be configured for cleaning objects in said wiping aperture 120.

Said rope cleaning tool 100 comprises said unsqueezed configuration 130 and said squeezed configuration 300. Said unsqueezed configuration 130 comprises said rope cleaning tool 100 without said inward force 202 applied to said frame assembly 104. Said squeezed configuration 300 comprises said rope cleaning tool 100 with said inward force 202 applied to a portion of said frame assembly 104. Said inward force 202 compress a portion of said one or more wiper disks 102 around said central portion 126, and can cause said wiping aperture 120 to compress around said central portion 126.

Said one or more wiper disks 102 comprises said plurality of fastener apertures 404 arranged around a perimeter portion of said one or more wiper disks 102.

Each among said plurality of fasteners 106 comprises said first fastener portion 600 and said second fastener portion 602. Said first shell portion **104*a* comprises a threaded fastener such as a bolt, and said second shell portion 104***b* comprises a threaded receiver such as a nut. Said second shell portion 104*b* comprises a slot for mechanical leverage when attaching and detaching from said first shell portion 104*a*.

Said rope cleaning tool 100 can be configured to use and replace said one or more wiper disks 102 to ensure said rope cleaning tool 100 remains useful for its design specification. Said one or more wiper disks 102 can be a wearable part and therefore replaceable when worn out.

Said rope cleaning tool 100 can be configured to clean said rope 800 by selectively receiving a portion of said rope 800 by sliding a portion of said rope 800 in said receiver slot 118 and into said wiping aperture 120, squeezing said frame assembly 104 together using said inward force 202, pressing said plurality of radial slots 124 against a portion of said rope 800, and pulling said rope 800 through said wiping aperture 120 to clear of debris from said rope 800.

Said one or more wiper disks 102 comprises said wiper thickness 408. Said rope cleaning tool 100 can be configured to receive said one or more wiper disks 102 in a range of said wiper thickness 408.

Said wiper thickness 408 falls within the range of 3 mm or 3 cm.

Said one or more wiper disks 102 comprises said plurality of layers 902. Said plurality of layers 902 of said one or more wiper disks 102 can be arranged between said first shell portion 104*a* and said second shell portion 104*b* of said frame assembly 104.

Each layer in said plurality of layers 902 comprises a different arrangement of said plurality of bristles 204 so as to apply an uneven pressure on said rope 800 as it can be pulled through said wiping aperture 120.

Said one or more wiper disks 102 comprises a material selected among a nylon, plastic, and 3D printed PLA.

Said one or more wiper disks 102, said first shell portion 104*a* and said second shell portion 104*b* comprises said plurality of fastener apertures 404 being aligned with said plurality of fasteners 106. Wherein, said plurality of fasteners 106 can each slide through one among said plurality of fastener apertures 404 of said first shell portion 104*a*, said one or more wiper disks 102 and said second shell portion 104*b* and hold said one or more wiper disks 102 within said wiper aperture 402.

One among said first shell portion 104*a* and said second shell portion 104*b* comprises said inner diameter lip 406 at least partially within said wiper aperture 402 and keeping said first shell portion 104*a* and said second shell portion 104*b* aligned.

Said one or more wiper disks 102 comprises said multi-layer configuration 900. Said multi-layer configuration 900 comprising a stack of said one or more wiper disks 102. Each among said multi-layer configuration 900 can be aligned according to said plurality of fasteners 106 and said fastener axis 604. Said plurality of layers 902 of said one or more wiper disks 102 can be arranged between said first shell portion 104*a* and said second shell portion 104*b*.

Said rope cleaning tool 100 comprises a plurality of said one or more wiper disks 102 comprising different materials such as stiffer and softer plastics, with less sharp points on said plurality of bristles 204. Said one or more wiper disks 102 can be a wearable part and therefore replaceable when worn out.

Each layer in said plurality of layers 902 comprises a different rotary arrangements of said plurality of bristles 204 relative to said central portion 126 of said wiping aperture 120 and configured for applying an uneven pressure on said rope 800 as it can be pulled through said wiping aperture 120.

Said rope cleaning tool 100 for cleaning said rope 800. Said rope cleaning tool 100 comprises said one or more wiper disks 102 and said frame assembly 104. Said frame assembly 104 comprises said first shell portion 104*a* and said second shell portion 104*b*, and said plurality of fasteners 106. Said plurality of fasteners 106 comprise at least said first fastener 106*a*, and each comprise said first fastener portion 600 and said second fastener portion 602. Said frame assembly 104 can be attached to a portion of said one or more wiper disks 102 using a portion of said plurality of fasteners 106. Each among said frame assembly 104 comprises said enclosed end 114 and said open end 116. Said one or more wiper disks 102 comprises said receiver slot 118 and said wiping aperture 120. Said receiver slot 118 can be aligned with said open end 116 of said frame assembly 104. Said receiver slot 118 and said wiping aperture 120 comprises a cut in said one or more wiper disks 102 allowing an object to pass through said receiver slot 118 and slide into said wiping aperture 120 without disassembling said rope cleaning tool 100. Said one or more wiper disks 102 comprises said wiper thickness 408. Said rope cleaning tool 100 can be configured to receive said one or more wiper disks 102 in a range of said wiper thickness 408. Said wiper thickness 408 falls within the range of 3 mm or 3 cm.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A rope cleaning tool for cleaning a rope, wherein:

said rope cleaning tool comprises one or more wiper disks and a frame assembly;

said frame assembly comprises a first shell portion and a second shell portion, and a plurality of fasteners;

said plurality of fasteners comprise at least a first fastener, and each comprise a first fastener portion and a second fastener portion;

said frame assembly is attached to a portion of said one or more wiper disks using a portion of said plurality of fasteners;

each among said frame assembly comprises an enclosed end and an open end;

said one or more wiper disks comprises a receiver slot and a wiping aperture;

said receiver slot is aligned with said open end of said frame assembly;

said receiver slot and said wiping aperture comprises a cut in said one or more wiper disks allowing an object to pass through said receiver slot and slide into said wiping aperture without disassembling said rope cleaning tool; and one among said first shell portion and said second shell portion comprises an inner diameter lip at least partially within said wiper aperture and keeping said first shell portion and said second shell portion aligned.

2. The rope cleaning tool of claim 1, wherein:

said wiping aperture further comprises a central portion and a plurality of radial slots arranged around said central portion;

said central portion comprises a round shape;

said plurality of radial slots extend outward from said central portion toward said frame assembly;

said plurality of radial slots are configured to allow said one or more wiper disks to be deformed when squeezing said frame assembly with an inward force;

said one or more wiper disks comprises a plurality of bristles comprising portions of said one or more wiper disks between said plurality of radial slots; and each among said plurality of bristles are configured for cleaning objects in said wiping aperture.

3. The rope cleaning tool of claim 2, wherein:

said rope cleaning tool comprises an unsqueezed configuration and a squeezed configuration;

said unsqueezed configuration comprises said rope cleaning tool without said inward force applied to said frame assembly;

said squeezed configuration comprises said rope cleaning tool with said inward force applied to a portion of said frame assembly; and said inward force compresses a portion of said one or more wiper disks around said central portion, and causes said wiping aperture to compress around said central portion.

4. The rope cleaning tool of claim 1, wherein:

said one or more wiper disks comprises a plurality of fastener apertures arranged around a perimeter portion of said one or more wiper disks.

5. The rope cleaning tool of claim 1, wherein:

each among said plurality of fasteners comprises said first fastener portion and said second fastener portion;

said first shell portion comprises a threaded fastener, and said second shell portion comprises a threaded receiver; and said second shell portion comprises a slot for mechanical leverage when attaching and detaching from said first shell portion.

6. The rope cleaning tool of claim 1, wherein:

said one or more wiper disks further comprise one or more post apertures;

said one or more post apertures and said plurality of fastener apertures is arranged about a perimeter of said one or more wiper disks between said plurality of radial slots and an exterior edge of said one or more wiper disks;

said rope cleaning tool comprises one or more posts; and said one or more posts support said first shell portion and said second shell portion from collapsing inward at a wiper aperture.

7. The rope cleaning tool of claim 1, wherein:

said rope cleaning tool is configured to clean said rope by selectively receiving a portion of said rope by sliding a portion of said rope in said receiver slot and into said wiping aperture, squeezing said frame assembly together using said inward force, pressing said plurality of radial slots against a portion of said rope, and pulling said rope through said wiping aperture to clear of debris from said rope.

8. The rope cleaning tool of claim 1, wherein:

said one or more wiper disks comprises a wiper thickness; and said rope cleaning tool is configured to receive said one or more wiper disks in a range of said wiper thickness.

9. The rope cleaning tool of claim 8, wherein:

said wiper thickness is 3 mm to 3 cm.

10. The rope cleaning tool of claim 1, wherein:

said one or more wiper disks comprises a plurality of layers;

said plurality of layers of said one or more wiper disks are arranged between said first shell portion and said second shell portion of said frame assembly.

11. The rope cleaning tool of claim 10, wherein:

each layer in said plurality of layers comprises a different arrangement of said plurality of bristles to apply an uneven pressure on said rope as it is pulled through said wiping aperture.

12. The rope cleaning tool of claim 1, wherein:

said one or more wiper disks comprises a material selected among a nylon, plastic, and 3d printed PLA.

13. The rope cleaning tool of claim 1, wherein:

said one or more wiper disks, said first shell portion and said second shell portion comprises said plurality of fastener apertures being aligned with said plurality of fasteners; and wherein, said plurality of fasteners each slide through one among said plurality of fastener apertures of said first shell portion, said one or more wiper disks and said second shell portion and hold said one or more wiper disks within said wiper aperture.

14. The rope cleaning tool of claim 1, wherein:

said one or more wiper disks comprises a multi-layer configuration;

said multi-layer configuration comprising a stack of said one or more wiper disks;

each among said multi-layer configuration are aligned according to said plurality of fasteners and a fastener axis; and said plurality of layers of said one or more wiper disks is arranged between said first shell portion and said second shell portion.

15. The rope cleaning tool of claim 14, wherein:

said rope cleaning tool comprises a plurality of said one or more wiper disks comprising different materials such as stiffer and softer plastics, with less sharp points on said plurality of bristles; and said one or more wiper disks is a wearable part and therefore replaceable when worn out.

16. The rope cleaning tool of claim 14, wherein:

each layer in said plurality of layers comprises a different rotary arrangements of said plurality of bristles relative to said central portion of said wiping aperture and configured for applying an uneven pressure on said rope as it is pulled through said wiping aperture.

17. A rope cleaning tool for cleaning a rope, wherein:

said rope cleaning tool comprises one or more wiper disks and a frame assembly;

said frame assembly comprises a first shell portion and a second shell portion, and a plurality of fasteners;

said plurality of fasteners comprise at least a first fastener, and each comprise a first fastener portion and a second fastener portion;

said frame assembly is attached to a portion of said one or more wiper disks using a portion of said plurality of fasteners;

each among said frame assembly comprises an enclosed end and an open end;

said one or more wiper disks comprises a receiver slot and a wiping aperture;

said receiver slot is aligned with said open end of said frame assembly;

said receiver slot and said wiping aperture comprises a cut in said one or more wiper disks allowing an object to pass through said receiver slot and slide into said wiping aperture without disassembling said rope cleaning tool;

said one or more wiper disks comprises a multi-layer configuration;

said multi-layer configuration comprising a stack of said one or more wiper disks;

each among said multi-layer configuration are aligned according to said plurality of fasteners and a fastener axis; and said plurality of layers of said one or more wiper disks is arranged between said first shell portion and said second shell portion;

said rope cleaning tool comprises a plurality of said one or more wiper disks comprising different materials such as stiffer and softer plastics, with less sharp points on said plurality of bristles; and said one or more wiper disks is a wearable part and therefore replaceable when worn out.

* * * * *